(12) United States Patent
Gilge

(10) Patent No.: US 8,914,614 B2
(45) Date of Patent: Dec. 16, 2014

(54) DATA GATHERING/DATA PROCESSING DEVICE FOR VIDEO/AUDIO SIGNALS

(75) Inventor: Michael Gilge, Nürnberg (DE)

(73) Assignee: Robert Bosch GmbH, Stuttgart (DE)

( * ) Notice: Subject to any disclaimer, the term of this patent is extended or adjusted under 35 U.S.C. 154(b) by 1026 days.

(21) Appl. No.: 10/587,667

(22) PCT Filed: Jan. 26, 2005

(86) PCT No.: PCT/EP2005/050320
§ 371 (c)(1),
(2), (4) Date: Jun. 8, 2007

(87) PCT Pub. No.: WO2005/071559
PCT Pub. Date: Aug. 4, 2005

(65) Prior Publication Data
US 2007/0226459 A1    Sep. 27, 2007

(30) Foreign Application Priority Data
Jan. 27, 2004   (DE) .......................... 10 2004 003 889

(51) Int. Cl.
*G06F 15/76*     (2006.01)
*H04N 7/18*      (2006.01)

(52) U.S. Cl.
CPC .................................... *H04N 7/181* (2013.01)
USPC ........................................... 712/28; 709/252

(58) Field of Classification Search
USPC ........................................... 712/28; 709/252
See application file for complete search history.

(56) References Cited

U.S. PATENT DOCUMENTS

2002/0170064 A1   11/2002  Monroe et al.
2004/0264493 A1*  12/2004  Han ............................. 370/445

FOREIGN PATENT DOCUMENTS

| DE | 101 53 484   | 5/2003 |
| JP | 2001223729   | 8/2001 |
| JP | 2003337805   | 11/2003 |
| WO | WO 98/23075  | 5/1998 |
| WO | WO 02/43360  | 5/2002 |

OTHER PUBLICATIONS

James Martin, Local Area Networks, Prentice Hall, 1999, pp. 4, 6, 8, 192-193, and 312-313.*
Pidgeon, Nick. "How Ethernet Works." Apr. 1, 2000. HowStuffWorks.com.*
Jerry Rosenberg, Dictionary of Computers, Information Processing, and Telecommunications, 2$^{nd}$ edition, Wiley, 1987, p. 598.*
Andrew S. Tannenbaum; "Computer Networks" 2003, Prentice Hall Ptr, pp. 67 and 327.

* cited by examiner

*Primary Examiner* — Andrew Caldwell
*Assistant Examiner* — Benjamin Geib
(74) *Attorney, Agent, or Firm* — Kenyon & Kenyon LLP

(57) ABSTRACT

In order to create a data gathering/data processing device for video/audio signals which includes a plurality of signal processors and which has an optimized hardware architecture, it is provided that the signal processors or a subset of the signal processors are coupled to a network having a star-shaped topology.

22 Claims, 1 Drawing Sheet

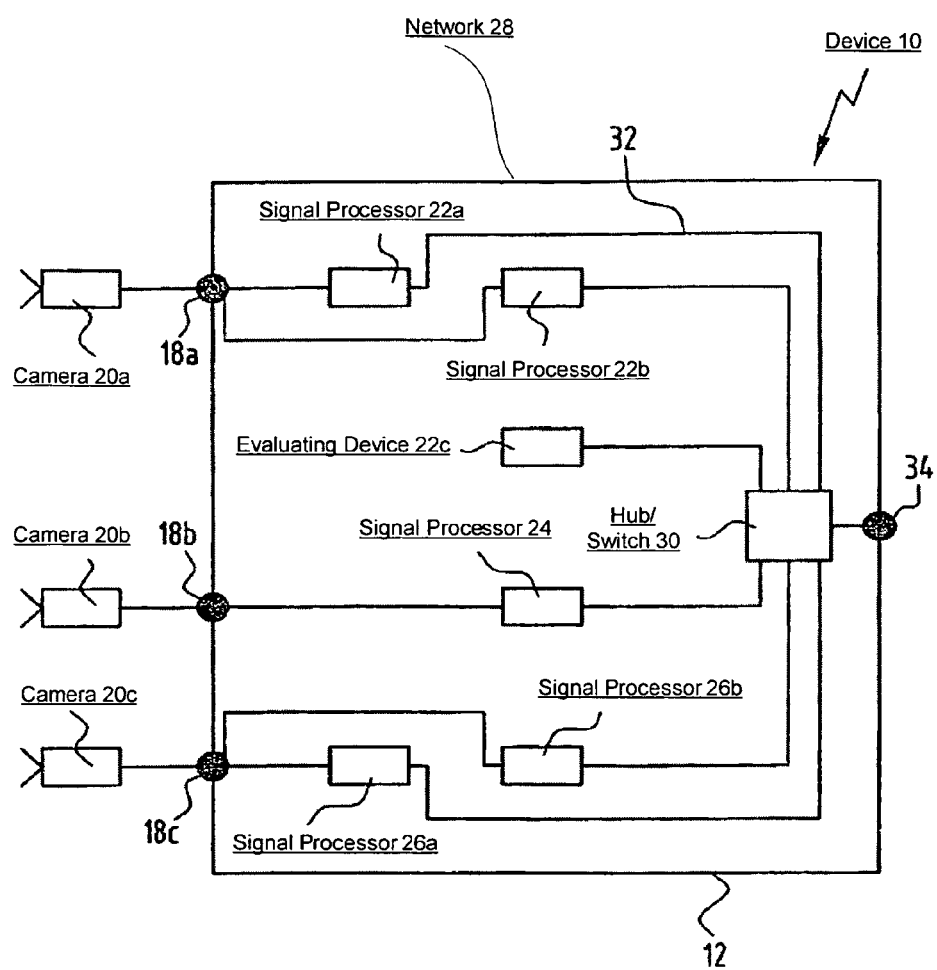

DATA GATHERING/DATA PROCESSING DEVICE FOR VIDEO/AUDIO SIGNALS

FIELD OF THE INVENTION

The present invention relates to a data gathering/data processing device for video/audio signals, which includes a plurality of signal processors.

BACKGROUND INFORMATION

A device is described in German Patent Application No. DE 101 53 484, for example. The video/audio system includes at least one gathering device which supplies digital video/audio data, a plurality of processing devices (especially signal processors), a processing device being assigned to at least one gathering device, processes data of the appertaining gathering device and makes available modified data, and an evaluating device that is coupled to the processing devices, and by which the modified data made available by the respective processing devices are comparable and evaluable, in order to make available a selected data record optimized for an application.

An object of the present invention is creating a data gathering/data processing device for video/audio signals which has an optimized hardware architecture.

SUMMARY OF THE INVENTION

According to the present invention, this object is attained in that the signal processors or a subset of the signal processors are coupled to a network having a star-shaped topology.

Because of the design approach according to the present invention, a transparent hardware architecture comes about. Thus, there is developed a good scalability, the same linking philosophy being applicable to all subassemblies of the device.

In particular, when using an appropriate standard such as the Ethernet standard, the expenditure for lines may be held low, since, for example, only four signal lines per signal processor are required to form the network. The susceptibility to malfunction is reduced. Problems with respect to signal propagation delay and distance are avoided. A dedicated bandwidth is able to be assigned to each subassembly.

Assured bandwidths of, for instance, 100 Mbit/s or 1000 Mbit/s or greater, may be achieved. A corresponding device is able to be manufactured cost-effectively, since the hardware components required, such as hubs or switches are available as standard components.

A full duplex operation is able to be implemented in all signal propagation directions (transmitting and receiving) via a star-shaped wiring up of the signal processors. This makes it possible to ensure a real time operation; the real time processing of data is of decisive importance in the case of video and audio data.

In particular, the signal processors or a subset of the signal processors are linked to one another via the network having a star-shaped topology. It is thereby possible to exchange data between individual signal processors, in particular all signal processors being able to communicate with one another at the same time. Because of that, it is possible to implement the system described in German Patent Application No. DE 101 53 484 using a plurality of processing devices and an evaluating device, coupled to the processing devices, in a simple and cost-effective manner.

In particular, it is provided that the network is integrated into the device. It is for that reason that a data communication between the signal processors of the device may be carried out in a simple and secure manner. As mentioned above, signal propagation delay problems may be avoided. The unit then has a network microarchitecture, so that no external network macroarchitecture is necessary any more. The network microarchitecture, in turn, may be optimally developed, for example, with respect to bandwidth and hardware equipment (such as switches).

In particular, the network forms a backbone for the device, that is, a backbone for the signal processors.

It is quite particularly advantageous if the network is formed according to the Ethernet standard, and the data traffic on the network takes place according to the Ethernet standard. The Ethernet standard is shown in IEEE 802.3. In the Ethernet standard only four signal lines have to be provided per signal processor (whereas, for example, in the PCI bus a substantially greater number of lines has to be provided). The signal processors are able to communicate simultaneously (whereas in the PCI bus no simultaneous communication is possible). A good scalability of the system comes about, since the same hardware philosophy applies to all subassemblies. A dedicated bandwidth may be assigned to each subassembly, which makes it possible to ensure the bandwidth, for instance, up to 100 Mbit/s or 1000 Mbit/s, or higher. No problems are created with regard to propagation delay and distance. Corresponding hardware components such as hubs, switches or ports are available, so that, in turn, cost-effective manufacturing is possible.

It may be provided that a hub, switch or port for the network is integrated into a housing that accommodates the signal processors. Thereby a minimized number of connections (terminals) may be provided for coupling the device, for instance, to the Internet or an intranet, so that a compact construction comes about.

Basically it is also possible that a hub, switch or port for the network is situated externally with respect to a housing that accommodates the signal processors. Thereby one obtains, for instance, easy exchangeability.

In particular, at least one connection is provided for coupling in video/audio signals. At such a connection, especially digital video/audio data, which are made available by a digital video camera or by an analog camera having subsequent conversion, may be injected into the device, so that one is able to gather the data and process them. For instance, data compression and/or data evaluation may be provided.

In this connection it is favorable if two signal processors are assigned to one connection. Thereby one is able to implement a video/audio system according to German Patent Application No. DE 101 53 484, in which an evaluating device is coupled to a plurality of processing devices and whereby the modified data made available by the respective processing devices are comparable and evaluable, in order to make available an optimized data record selected for an application. This data record may then be transmitted, for instance, via a digital network to a memory device.

At least one connection is favorably provided for transmission of data to a digital network, this connection preferably being coupled to the network of the device. Thereby, for example, one may then transmit compressed data, made available by a signal processor, first via the digital network, to a hub, a switch or a port, and from there via the digital network.

In particular, the connection is coupled to a hub, switch or port of the network of the device, so that even via the network an external communication is also possible. Thus, by the digital network one may achieve internal communication of the signal processors of the device among one another, and communication of the signal processors, and especially the transmitting of data of the signal processors, to the outside.

BRIEF DESCRIPTION OF THE DRAWING

FIG. 1 shows a schematic block diagram of an exemplary embodiment of a data gathering/data processing device according to the present invention.

DETAILED DESCRIPTION

An exemplary embodiment of a data gathering/data processing device according to the present invention for video/audio signals, which is shown schematically in FIG. 1, and is designated there, as a whole, by numeral 10, includes a housing 12, in which there is situated a plurality of signal processors 22a, 22b, 24, 26a, and 26b, which may be digital signal processors (DSPs).

Device 10 has a plurality of connections 18a, 18b and 18c for injecting (digital) video/audio signals. The signals thus injected are then able to be processed by signal processors 22a, 22b, 26a, and 26b.

A camera 20a, 20b, 20c and/or a microphone are interconnected to each respective connection 18a, 18b, 18c. The device may have, for instance, 32 connections, so that altogether 32 cameras and/or microphones are able to be connected. But fewer than 32 cameras/microphones may also be connected. Basically, the number of connections is as desired.

Cameras 20a, 20b, 20c make available video data. Device 10 receives especially digital video signals. A digital camera makes available video signals that are already digital. An a/d converter may be postconnected to an analog camera to convert the analog video signals into digital signals. The same applies correspondingly to microphones. In FIG. 1, reference numerals 20a, 20b, 20c refer to a digital camera and/or a digital microphone and/or an analog camera or an analog microphone having a postconnected a/d converter.

At least one signal processor is assigned to each connection 18a, 18b and 18c. In the exemplary embodiment shown, two signal processors 22a and 22b are assigned to connection 18a. One signal processor 24 is assigned to connection 18b. Two signal processors 26a, 26b are assigned to connection 18c.

Because of a plurality of signal processors 22a, 22b or 26a, 26b, which are assigned to a respective connection 18a or 18c, injected video/audio signals may be gathered and processed in different ways. For instance, via signal processor 22a one may carry out a compression of the injected data. Via signal processor 22b one may perform an analysis of the injected data. Via signal processor 26a one may, for instance, carry out a data comparison.

German Patent Application No. DE 101 53 484 describes a corresponding video/audio system which includes a plurality of processing devices (that is, especially, signal processors), a processing device being assigned to at least one gathering device (that is, especially, a connection for a camera and/or a microphone), and which processes data from the appertaining gathering device and makes modified data available, and furthermore an evaluating device, which is interconnected with the processing device, and whereby modified data made available by the respective processing devices are comparable and evaluable, so as to make available a selected data record that is optimized for an application. Specific reference is made to this document. Such an evaluating device is shown schematically in FIG. 1, and designated there by reference numeral 22c.

According to the present invention, it is provided that the plurality of signal processors 22a, 22b, 26a, and 26b (or a subset thereof) are interconnected with a network 28 having a star-shaped topology, and are thereby linked to one another. Network 28 has a hub or a switch 30, connecting lines leading in from each of the corresponding components (in the example shown, from signal processors 22a, 22b, 24, 26a, and 26b and evaluating device 22c) to the hub or switch 30. According to the present invention, a network 28 having a star-shaped topology is integrated into device 10. This network 28 links signal processors of data gathering device and data processing device 10 (e.g., signal processors 22a, 22b, 26a and 26b). Network 28 forms a backbone (backplane) of device 10. Network 28 is built into the device, and is particularly integrated into it.

Device 10 has at least one connection 34, via which device 10 is able to be connected to a digital network such as the Internet or an intranet. For this, an appropriate interface is provided. This connection 34 is interconnected with network 28 and particularly to the hub or switch 30 or an appropriate port or formed by it. It may be provided, in this context, that the hub or switch 30 or the port is situated within housing 12. Basically it is also possible that the hub or switch 30 and/or the port is situated outside housing 12.

In one advantageous specific embodiment, network 28 is constructed according to the Ethernet standard, and the data traffic on network 28 takes place according to the Ethernet standard. The corresponding hardware elements such as the hub, switch and port are then corresponding Ethernet components. The Ethernet standard is shown in IEEE 802.3.

In one Ethernet network 28, four data lines 32 are required from respective signal processors 22a, 22b, 26a, and 26b to hub or switch 30 (Tx+, Tx−, Rx+, Rx−).

In the Ethernet standard having a star-shaped network, all signal processors 22a, 22b, 26a, and 26b are able to communicate with one another in full duplex mode.

By using network 28 having star-shaped topology, and particularly using Ethernet standard, the expenditure for lines may be held low, since only just four lines have to be provided for each signal processor 22a, 22b, 26a, and 26b. In turn, manufacturing is simplified by this. There are no problems with signal propagation delay and with distance. Furthermore, hardware modules such as hubs, switches and ports are available. In addition, a good scalability comes about. Furthermore, susceptibility to malfunctioning is reduced. A certain bandwidth is assigned to each subassembly, for instance, to signal processors 22a, 22b, which is then also able to be used appropriately.

What is claimed is:

1. A data gathering/data processing device for video/audio signals, comprising:
    a plurality of signal processors; and
    an evaluation device configured to analyze output of at least a subset of the signal processors, the evaluation device and the at least a subset of the signal processors each forming a direct link to one of a central hub, a switch and a port, of a network having a star-shaped topology.

2. The device according to claim 1, wherein the at least a subset of the signal processors are communicatively interlinked via the one of a central hub, a switch and a port of the network.

3. The device according to claim 1, wherein the network is integrated into the device.

4. The device according to claim 1, wherein the network forms a backbone for the device.

5. The device according to claim 1, wherein the network is designed according to the Ethernet standard.

6. The device according to claim 1, wherein data traffic on the network proceeds according to the Ethernet standard.

7. The device according to claim 1, further comprising:
a housing, the one of a hub, a switch and a port of the network being integrated into the housing which accommodates the signal processors.

8. The device according to claim 1, further comprising:
a housing, the one of a hub, a switch and a port of the network being situated externally with respect to the housing which accommodates the signal processors.

9. The device according to claim 1, further comprising:
at least one connection for inputting video/audio signals to the at least a subset of the signal processors.

10. The device according to claim 1, further comprising:
at least one connection, at least two of the signal processors being assigned to the at least one connection.

11. The device according to claim 1, further comprising:
at least one connection for a transmission of data to a digital network.

12. The device according to claim 11, wherein the connection is coupled to the network of the device.

13. The device according to claim 11, wherein the connection is coupled to at least one of a hub, a switch and a port of the network of the device.

14. The device according to claim 1, further comprising:
a housing, the one of a hub, a switch and a port of the network being integrated into the housing which accommodates the signal processors;
at least one connection for inputting video/audio signals to the at least a subset of the signal processors; and
at least one connection for a transmission of data to a digital network;
wherein:
the at least a subset of the signal processors are communicatively interlinked via the one of a central hub, a switch and a port of the network,
the network is integrated into the device,
the network forms a backbone for the device, and
the network is designed according to the Ethernet standard, and data traffic on the network proceeds according to the Ethernet standard.

15. The device according to claim 14, wherein the at least one connection for a transmission of data to a digital network is coupled to the network of the device, and coupled to the one of a hub, a switch and a port of the network of the device.

16. The device according to claim 1, wherein the plurality of signal processors are configured to communicate with one another in full duplex mode.

17. The device according to claim 1, wherein at least a subset of the plurality of signal processors is assigned a specific bandwidth.

18. The device according to claim 1, wherein at least two of the plurality of signal processors are connected to the same signal source, a first one of the at least two of the plurality of signal processors is configured to perform a compression of a signal received from the signal source, and a second one of the at least two of the plurality of signal processors is configured to perform an analysis of the signal received from the signal source.

19. The device according to claim 1, wherein internal communication between the plurality of signal processors occurs over a digital network coupled to the network having a star-shaped topology.

20. The device according to claim 1, wherein:
the plurality of signal processors are configured to communicate with one another in full duplex mode,
at least a subset of the plurality of signal processors is assigned a specific bandwidth,
at least two of the plurality of signal processors are connected to the same signal source,
a first one of the at least two of the plurality of signal processors is configured to perform a compression of a signal received from the signal source, and a second one of the at least two of the plurality of signal processors is configured to perform an analysis of the signal received from the signal source, and
internal communication between the plurality of signal processors occurs over a digital network coupled to the network having a star-shaped topology.

21. A device, comprising:
a housing having a plurality of input connections and an output connection, each of the input connections adapted to receive an audio/visual signal;
a plurality of signal processors coupled to the input connections, at least two of the plurality of signal processors being coupled to a shared input connection, a first one of the at least two of the plurality of signal processors configured to perform a compression of a signal from the shared input connection, and a second one of the at least two of the plurality of signal processors configured to perform an analysis of the signal from the shared input connection;
an evaluation device to analyze output of at least a subset of the signal processors; and
one of a central hub, a switch and a port, directly connected to each of the signal processors and to the evaluation device to form a network having a star-shaped topology, each of the connections to the one of a central hub, a switch and a port being assigned a specific communication bandwidth;
wherein the one of a central hub, a switch and a port is configured to engage in full duplex communication with each of the signal processors, communicate the output of the at least a subset of the signal processors to the evaluation device, communicate an output of the evaluation device to a second device coupled to the output connection, and communicate an input from the second device, received via the output connection, to the evaluation device.

22. A device, comprising:
a housing having a plurality of input connections and a plurality of output connections, each of the input connections adapted to receive an audio/visual signal;
a plurality of signal processors coupled to the input connections, at least two of the plurality of signal processors being coupled to a shared input connection, a first one of the at least two of the plurality of signal processors configured to perform a compression of a signal from the shared input connection, and a second one of the at least two of the plurality of signal processors configured to perform an analysis of the signal from the shared input connection; and
an evaluation device configured to analyze output of at least a subset of the signal processors;
wherein, each of the plurality of signal processors and the evaluation device is directly coupled to one of a central hub, a switch and a port, via a respective one of the plurality of output connections, to form a network having a star-shaped topology, each of the connections to the one of a central hub, a switch and a port being assigned a specific communication bandwidth, and
wherein the one of a central hub, a switch and a port is configured to engage in full duplex communication with each of the signal processors, communicate the output of the at least a subset of the signal processors to the evaluation device, communicate an output of the evaluation device to a second device coupled to an output connection of the one of a central hub, a switch and a port, and communicate an input from the second device, received via the output connection of the one of a central hub, a switch and a port, to the evaluation device.

* * * * *